United States Patent
Gerard et al.

(10) Patent No.: US 10,298,903 B2
(45) Date of Patent: May 21, 2019

(54) METHOD AND DEVICE FOR PROCESSING A PART OF AN IMMERSIVE VIDEO CONTENT ACCORDING TO THE POSITION OF REFERENCE PARTS

(71) Applicant: INTERDIGITAL CE PATENT HOLDINGS, Paris (FR)

(72) Inventors: Francois Gerard, Beignon (FR); Renaud Dore, Rennes (FR); Julien Fleureau, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 28 days.

(21) Appl. No.: 15/199,886

(22) Filed: Jun. 30, 2016

(65) Prior Publication Data

US 2017/0006275 A1    Jan. 5, 2017

(30) Foreign Application Priority Data

Jun. 30, 2015 (EP) .................................... 15306058

(51) Int. Cl.
  *H04N 13/332*  (2018.01)
  *H04N 13/117*  (2018.01)
  (Continued)

(52) U.S. Cl.
  CPC ......... *H04N 13/117* (2018.05); *G02B 27/017* (2013.01); *G09G 3/001* (2013.01);
  (Continued)

(58) Field of Classification Search
  None
  See application file for complete search history.

(56) References Cited

U.S. PATENT DOCUMENTS 5,850,352 A * 12/1998 Moezzi ................ H04N 13/139
                                                          345/419
6,356,664 B1   3/2002 Dunn et al.
(Continued)

FOREIGN PATENT DOCUMENTS

EP   1223559   7/2002
EP   1259080   11/2002
(Continued)

OTHER PUBLICATIONS

Mavlankar et al., "Pre-Fetching Based on Video Analysis for Interactive Region-of-Interest Streaming of Soccer Sequences", 16th IEEE International Conference on Image Processing, Cairo, Egypt, Nov. 7, 2009, pp. 3061-3064.
(Continued)

*Primary Examiner* — Chikaodili E Anyikire
(74) *Attorney, Agent, or Firm* — Brian J. Dorini, Esq.; Robert D. Shedd, Esq.

(57) ABSTRACT

A method for processing a first part of an immersive video content, for example the part to be displayed, on a client device. As to incite a user to look toward a reference part in the immersive video content, the method comprises determining a distance between the first part or subparts of the first part and at least a reference part, and processing a visually degraded version of the first part or its subparts, the greater the distance, the higher the level of the visual degradation.

18 Claims, 7 Drawing Sheets

(51) Int. Cl.
*H04N 13/15* (2018.01)
*H04N 13/383* (2018.01)
*G09G 3/00* (2006.01)
*G02B 27/01* (2006.01)

(52) U.S. Cl.
CPC ............ *H04N 13/15* (2018.05); *H04N 13/332* (2018.05); *H04N 13/383* (2018.05); *G02B 2027/014* (2013.01); *G02B 2027/0127* (2013.01)

(56) References Cited

U.S. PATENT DOCUMENTS

| | | | |
|---|---|---|---|
| 7,397,961 | B2 | 7/2008 | Keeney et al. |
| 9,749,451 | B2 * | 8/2017 | Hoellwarth ............ H04M 1/05 |
| 2009/0015679 | A1 | 1/2009 | Hayakawa et al. |
| 2010/0110298 | A1 | 5/2010 | Knee |
| 2013/0181901 | A1 * | 7/2013 | West ........................ G09G 5/14 |
| | | | 345/161 |
| 2013/0300634 | A1 | 11/2013 | White et al. |
| 2014/0092006 | A1 * | 4/2014 | Boelter ................... G06F 3/013 |
| | | | 345/156 |
| 2014/0361977 | A1 | 12/2014 | Stafford et al. |
| 2016/0191893 | A1 * | 6/2016 | Gewickey ............ H04N 13/025 |
| | | | 386/223 |
| 2016/0212338 | A1 * | 7/2016 | Seok .................. H04N 5/23238 |

FOREIGN PATENT DOCUMENTS

| | | |
|---|---|---|
| GB | 2467898 | 8/2010 |
| JP | 2001326881 | 11/2001 |
| WO | WO2013183206 | 12/2013 |

OTHER PUBLICATIONS

Kurzhals et al., "Evaluation of Attention-Guiding Video Visualization", Eurographics Conference on Visualization, vol. 32, No. 3, Jun. 2013, pp. 51-60.

Blackwell et al., "Restricted Focus Viewer: A Tool for Tracking Visual Attention", First International Conference on Theory and Applications of Diagrams, 2000, Edinburgh, Scotland, United Kingdom, Sep. 1, 2000, pp. 162-177.

* cited by examiner

METHOD AND DEVICE FOR PROCESSING A PART OF AN IMMERSIVE VIDEO CONTENT ACCORDING TO THE POSITION OF REFERENCE PARTS

This application claims the benefit, under 35 U.S.C. § 119 of European Patent Application No. 15306058.7, filed Jun. 30, 2015.

1. TECHNICAL FIELD

The present disclosure relates to the domain of pseudo-haptic feedback, especially when consuming immersive video content, especially with a head mounted displays (HMD) or a mobile device such as, for example, a tablet or a smartphone.

2. BACKGROUND ART

An immersive video content is a video content that is made to be displayed around a user, so that the user has the feeling to be in the middle of the content. Immersive video content is typically rendered in *geodes* or caves. In such apparatus, the content is entirely projected on wall screens and the user discovers the content by rotating his/her head.

Head-Mounted Displays (HMD) are display devices, worn on the head or as part of a helmet, that have a small display optic in front of one eye (monocular HMD) or each eye (binocular HMD). They are advantageously adapted to consume immersive content. In such a device, only a part of the video is displayed. The displayed part of the video content is updated according to the user head pose by the mean of an integrated Motion Unit Measurement (including a gyroscope) for instance.

Such devices were initially proposed some decades ago, but recently, due to the progress screens especially, their prices as well as their performances have been dramatically changed. The advent of such devices allows the user to watch a 4π steradians content by the mean of head rotations. If such a new feature may appear as a real improvement in terms of immersion in the content, as the user is watching at only a part of the content, he/she may not look at the direction he/she should look at a given moment. Indeed, as the user can gaze all around him/her, he/she may miss some important highlights of the narration because he/she is watching at another part of the content at the moment the narrative event happens.

According to the background art, it is known that forcing a virtual camera panning in order to make the user look toward the direction he/she has to look to, is a very efficient solution. However, it is well known that this solution has the drawback to make most of people sick and, as a consequence, to deteriorate the user's quality of experience.

3. SUMMARY

The purpose of the present disclosure is to overcome at least one of these disadvantages of the background.

More specifically, the purpose of the present disclosure is to encourage a user to watch a determined reference part of an immersive video content.

The present disclosure relates to a method of processing a first part of an immersive video content, the method comprising the steps of:
Determining a first distance between said first part and at least a reference part of the immersive video content,
Processing a version of said first part, called degraded version, a visual degradation being applied to said first part to obtain the degraded version, said degraded version being visually degraded with regard to the video content, the greater the first distance, the higher the level of the visual degradation.

According to a particular characteristic, the first part is divided in subparts, a second distance between each said subpart and said at least a reference part being determined, the greater the second distance, the higher the level of degradation for each said subpart.

Advantageously, level of degradation increases over time.
According to a specific characteristic, the first distance belongs to a group of distances comprising:

According to a particular characteristic, the first part is divided in subparts, a second distance between each said subpart and said at least a reference part being determined, the greater the second distance, the higher the level of degradation for each said subpart.

The present disclosure also relates to a device configured for processing a first part of an immersive video content, the device comprising:
Means for determining a first distance between said first part and at least a reference part,
Means for processing a version of said first part, called degraded version, said degraded version being visually degraded with regard to the video content, the greater said first distance, the higher the level of degradation.

Advantageously, the device further transmits said degraded version to a display device.

The present disclosure also relates to a device configured for processing a first part of an immersive video content, the device comprising at least one processor configured to:
Determine a first distance between said first part and at least a reference part,
Process a version of said first part, called degraded version, said degraded version being visually degraded with regard to the video content, the greater said first distance, the higher the level of degradation.

Optionally, the device further comprises a transmitter transmitting said degraded version to a display device.

The present disclosure also relates to a computer program product comprising instructions of program code for executing, by at least one processor, the abovementioned method of processing a part of an immersive video content, when the program is executed on a computer.

The present disclosure also relates to a (non-transitory) processor readable medium having stored therein instructions for causing a processor to perform at least the abovementioned method of processing a part of an immersive video content.

4. LIST OF FIGURES

The present disclosure will be better understood, and other specific features and advantages will emerge upon reading the following description, the description making reference to the annexed drawings wherein:

FIG. 1 diagrammatically shows a first part of an immersive video content, according to a specific embodiment of the present principles;

Figure 1:
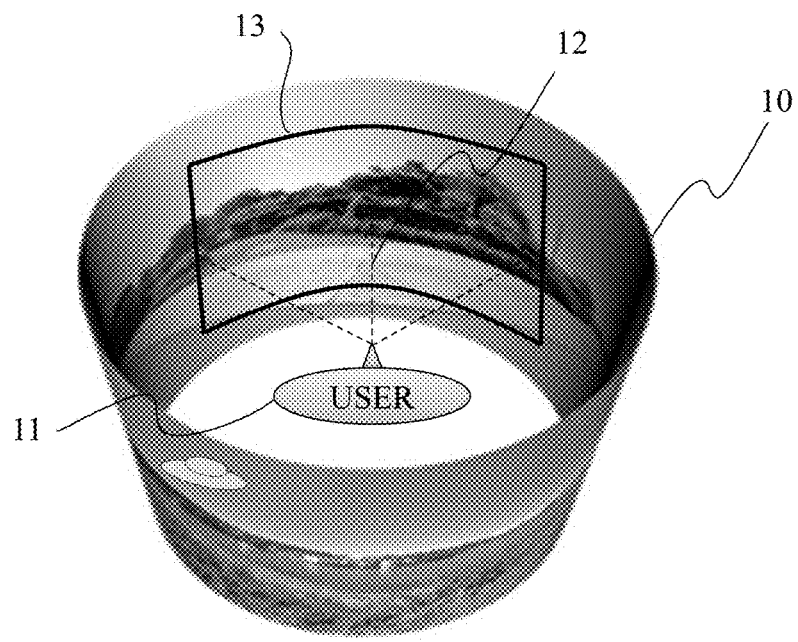
Figure 2:
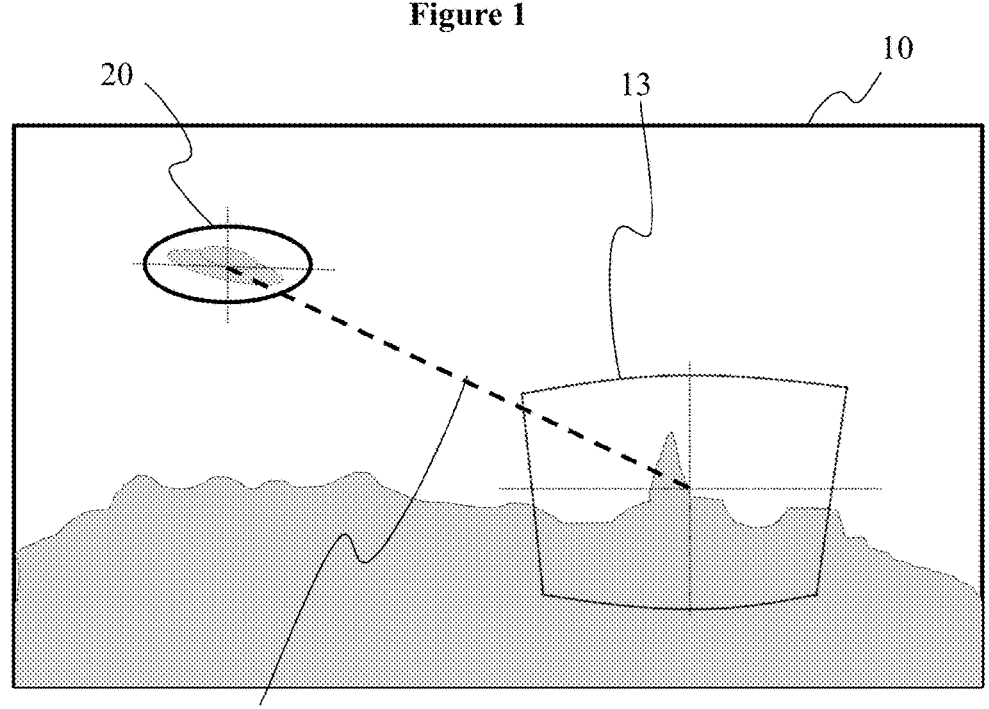
FIG. 2 shows a position of the first part of FIG. 1, a position of a reference part within the immersive video content, and a first distance between them, according to a specific embodiment of the present principles.
Figure 3A:
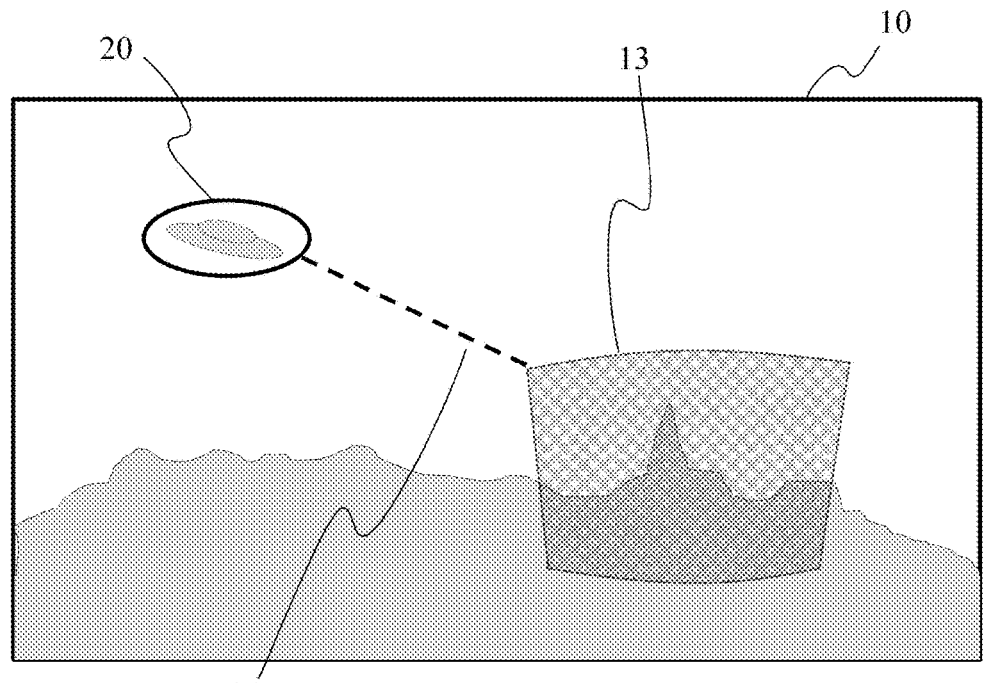
FIGS. 3A and 3B show a relationship between the first distance of FIG. 2 and a level of degradation to apply to the first part of FIG. 1.
Figure 3B:
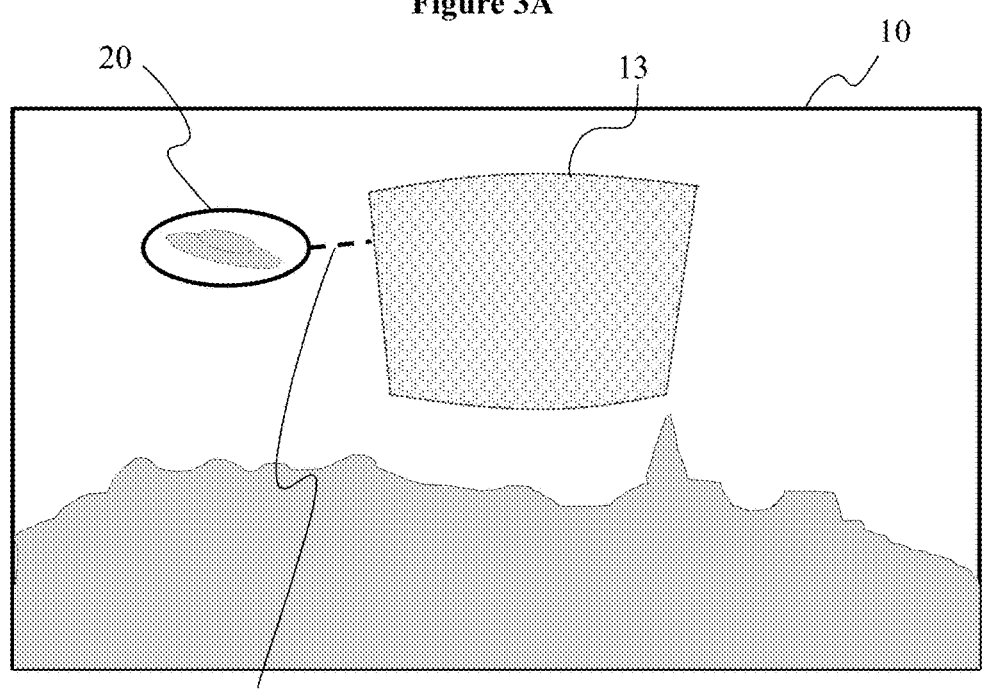
Figure 4:
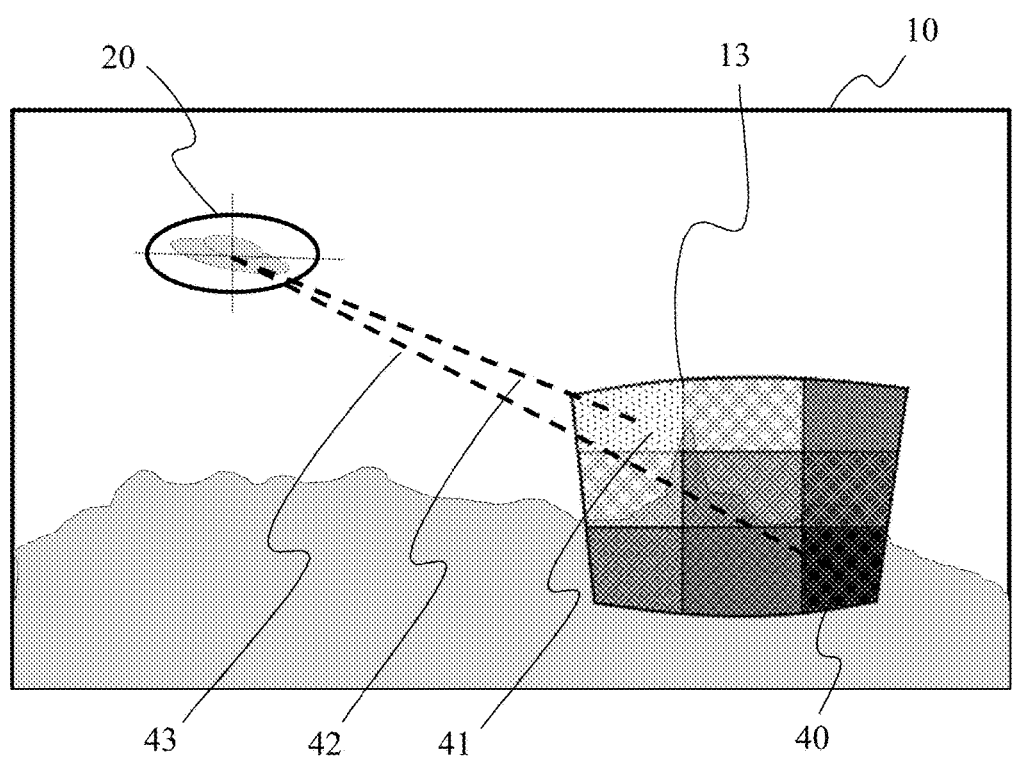
Figure 5:
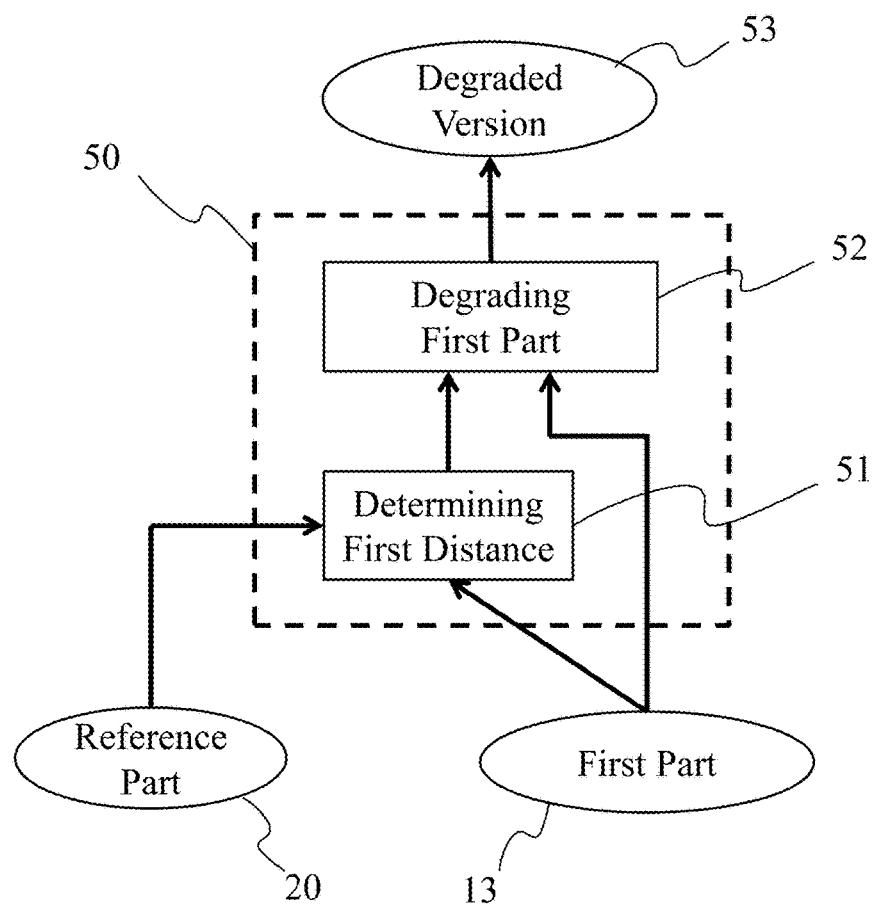
Figure 6:
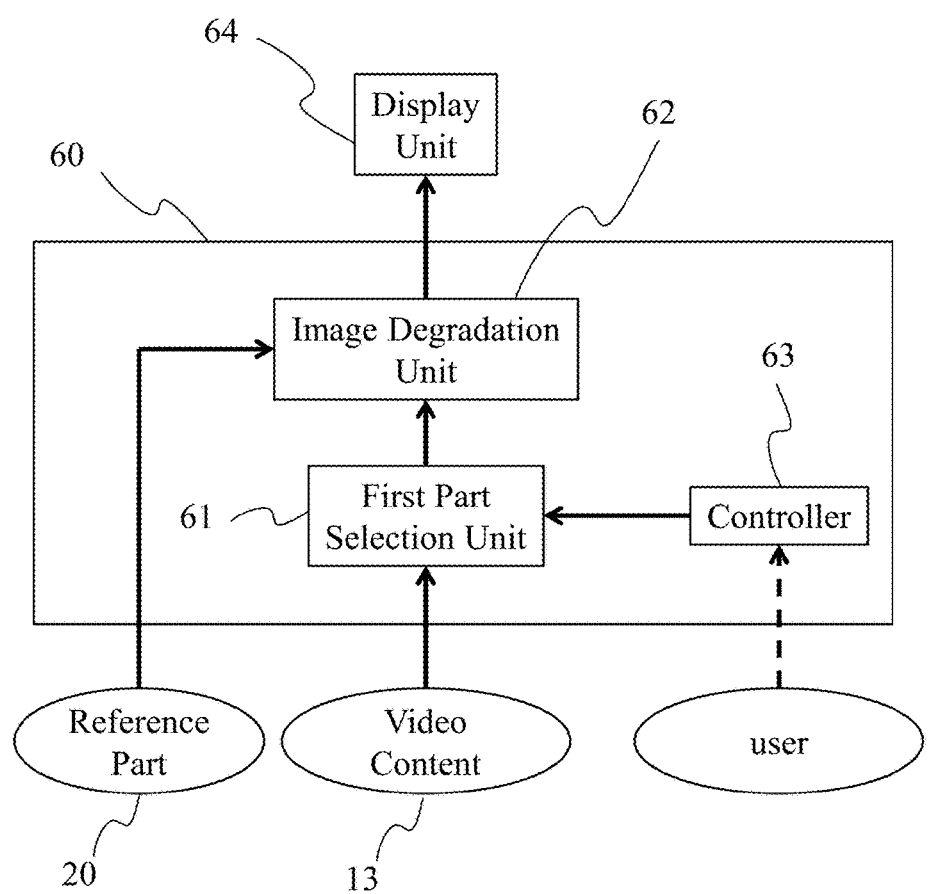
Figure 7:
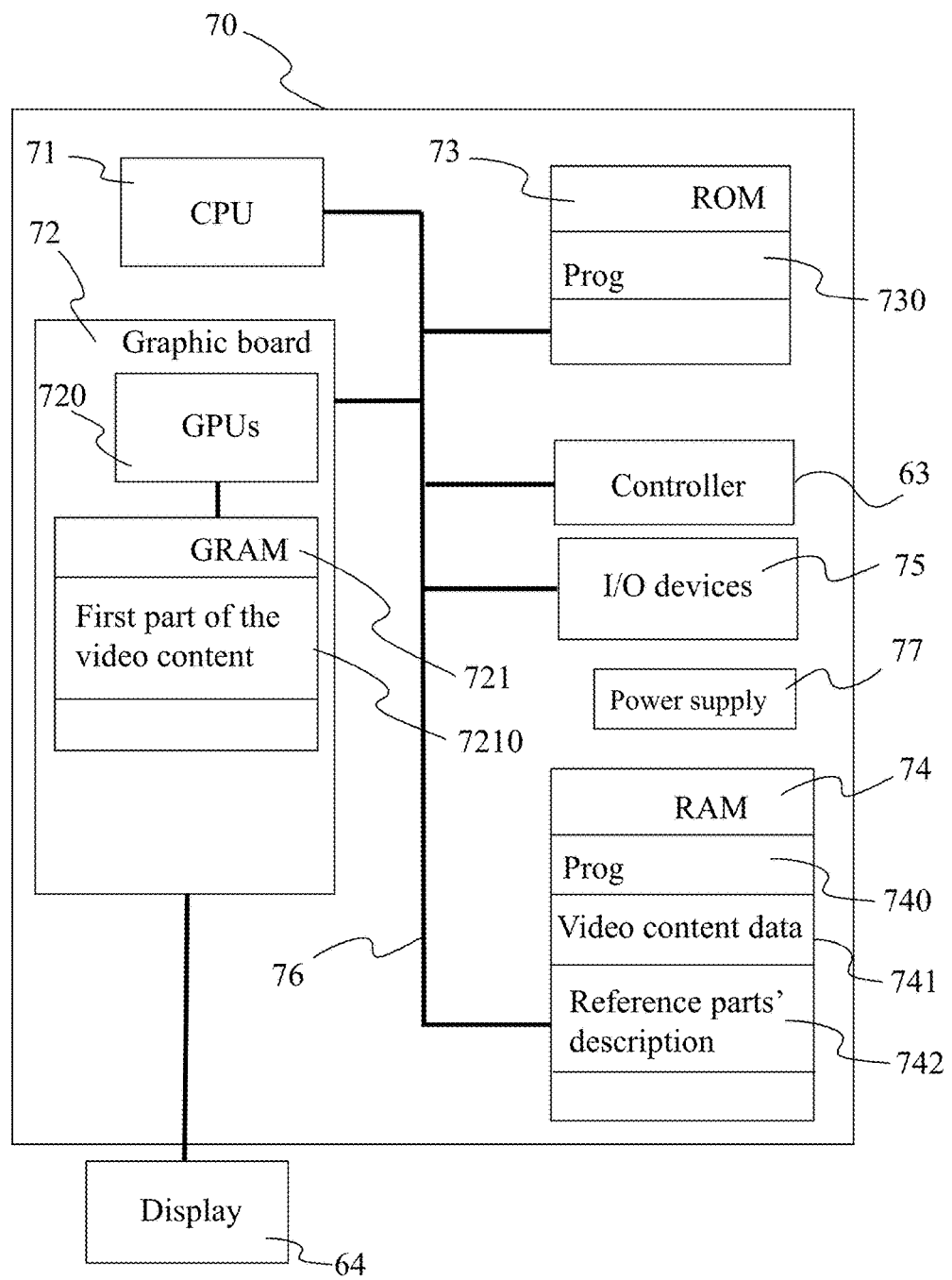

FIG. 4, the level of degradation of FIGS. 3A and 3B is computed for subparts of the first part of FIG. 1, according to a specific embodiment of the present principles;

FIG. 5 shows a method of processing the first part of FIG. 1 according to the first distance of FIG. 2, according to a specific embodiment of the present principles;

FIG. 6 diagrammatically shows a structure of a system configured to process the first part of FIG. 1, comprising a video part selection unit and an image degradation unit, according to a specific embodiment of the present principles;

FIG. 7 shows a structure of a system configured to process the first part of FIG. 1, according to a particular embodiment.

Figure 8:
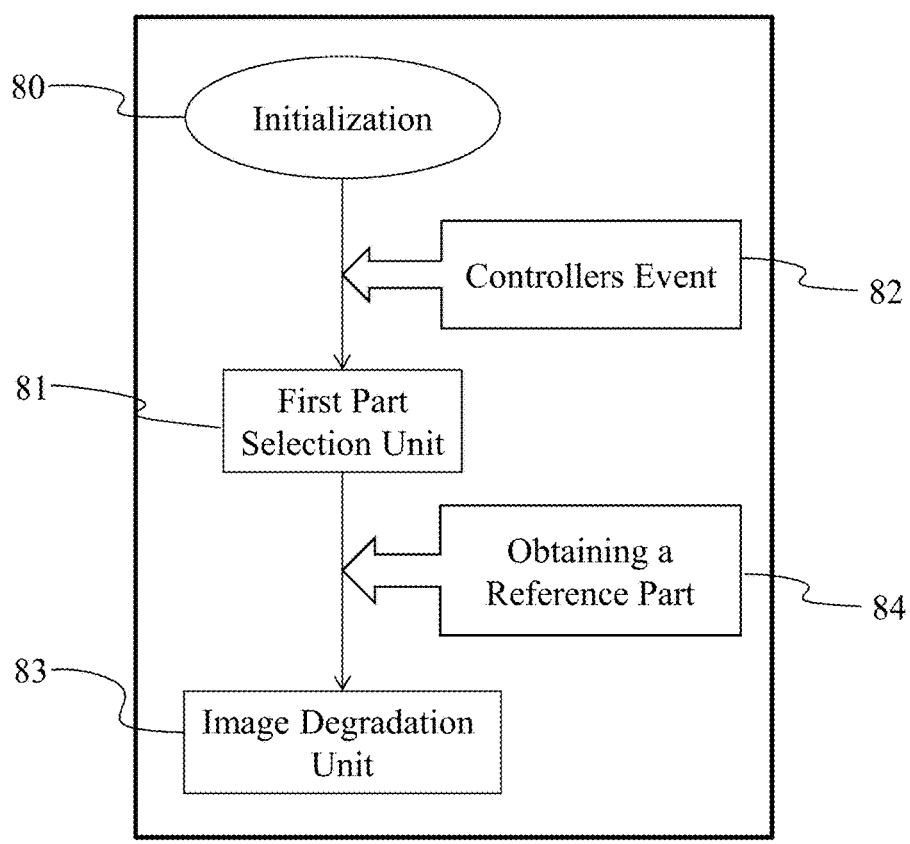

FIG. 8 shows a method of processing a part of a video content implemented in a processing device of FIG. 6 or FIG. 7, according to a particular embodiment.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It is understood that subject matter embodiments can be practiced without these specific details.

The present principles will be described in reference to a particular example of a method of processing a first part of an immersive video content with a partial displaying device such as a HMD. The visual quality of the first part is degraded. As the level of the visual degradation is increasing with the distance between the first part and the reference part, the closer to the reference part the user will rotate his/her head toward the reference part, the better his/her quality of experience will be. This degradation of the user's visual quality of experience has the advantage to incite him/her to look toward a reference part, less degraded.

FIG. 1 shows a particular embodiment of an immersive video content. Immersive and rectangular videos have a different nature. A rectangular video content can be considered as a function that associates each planar coordinate (x,y) in a rectangular frame located in front of the user to the representation of a colour. An immersive video content can be considered as a function that associates each polar coordinate (θ, φ) in a spherical frame located around the user to the representation of a colour. In both cases, the video is a temporal sequence of images often called frames. The data representative of a frame are organized as a rectangle (10). For rectangular videos, the conversion is direct. A cropping step is necessary when the rectangle of data has not the same size than the rectangle of the screen. In the case of an immersive video content, a projection mapping function is necessary to associate a planar coordinate in the data rectangle to a polar coordinate in the sphere of projection. On FIG. 1, the projection mapping mode is cylindrical. The immersive video content (10) is projected as a cylinder around the user (11). The user has to rotate his/her head around in order to watch at the content. His/her field of view does not encompass the entire content. According to a variant, the projection mapping mode is spherical. In another variant the projection mapping mode is cubical.

In the case of partial displaying devices such as HMD, only a part (13) of the immersive content (10) is displayed. This part, called first part, corresponds to the user's field of view. At any time, the user is orienting his/her device toward a direction (12) that determines the displayed part of the immersive video content.

At any time of the viewing session, at least one reference part of the immersive video content is obtained, this at least one reference part having a noticeable interest or importance. Such a reference part is an area of the video image, smaller than the content and usually smaller than the displayed part. A reference part is represented thanks to any known 2D geometric shape description format. For example, it is a 2D point located in the immersive video content's frame of reference. Other examples of shapes used for representing such reference parts are rectangles and ellipses (circles are particular cases of ellipses). Rectangles are, for example, described by one 2D point, a width and a height. Ellipses, on their side, are described by one center and two radii or by two centers and one radius. The description of the shape of a reference part is not limited to these examples but may also be described by any 2D surface description, for example as described in Scalable Vector Graphics (SVG) or in Hyper Text Markup Language 5 (HTML5) formats.

According to a particular example, the content creator has identified, within the content, at least one reference part, for at least one interval of time, as a highlight of the narration and he/she would like the viewer not to miss it. So, he/she wants to incite the viewer to look toward the direction of this reference part. In a first variant of this example, the set of reference part is the same from one viewing session to another one, independently to what is known about the user. According to a complementary variant of this example, the set of reference parts depends on the user's profile and is different from one user to another. The conditions of the content's viewing session, for instance the time of the day, are also parameters that modify the set of reference parts. In other words, the set of reference parts for one immersive video content is different from one viewing session to another one.

According to another example, the one or more reference parts is determined by a region of interest detection algorithm. Such an algorithm analyses the images of the video to automatically shape some regions which are estimated more interesting or more important for the user. For instance, such an algorithm computes a saliency map of images to detect highly salient areas. Another example of such an algorithm detects movement in the sequence of images to identify moving objects. According to a variant, the algorithm's parameters depends on the user's profile or on the conditions of the viewing session. In this variant, the set of reference parts for one immersive video content is different from one viewing session to another one.

The video content data is indifferently streamed from a server or read from a file stored on a storage device such as disk or a memory stick. The link used for transmitting the immersive video content may be wired (based for example on Universal Standard Bus (USB) or High Definition Multimedia Interface (HDMI)) or wireless (for example Wi-Fi or Bluetooth), indifferently. The immersive video content may also be generated on the fly by a 3D engine from the description of a 3D scene according to the position of a virtual camera located in this 3D scene. According to this example, the first part (13) corresponds to the part of the 3D scene that the virtual camera captures at any instant.

According to an example, a description of the shape and the timing of reference parts is inserted in the immersive video content, in the video stream data or in the video file indifferently. In another variant of the encoding of this example, this description is provided by a second server or is registered in a separate file.

FIG. 2 shows an example of the immersive video content (10) on which the part to be displayed (13) is a viewing window. A reference part (20) is identified outside the first part. In this example, it takes the shape of an ellipse. The reference part may correspond to a highlight of narration that did not yet happen. In such a case, the present principles have the advantage to incite the user to look toward the reference part in preparation of the happening.

A first distance (21) is computed between the first part and the reference part. According to the example of FIG. 2, the first distance (21) is the Euclidian distance between centers of the reference part on one hand and the center of the part to be displayed on the other hand. According to another example, every point of the first part is associated with every point of the reference part. A distance is computed for all of these couple of points and the first distance (31) corresponds to the shortest of them as illustrated on FIGS. 3A and 3B. According to a variant of this example, the first distance corresponds to an average of all these distances.

The first distance is advantageously computed each time that a move of at the reference part or a move of the displayed part is detected. In another variant, the first distance is computed more often, for instance for each video frame.

According to a particular embodiment, several reference parts are obtained at the same time. In a particular variant, the first distance is the shortest first distance, between each reference part and the first part, obtained thanks to one of the examples presented upper. According to another variant, the first distance is an average of the first distances obtained with one of the previous examples.

The visual quality of the first part is degraded according to the first distance. As shown on FIGS. 3A and 3B, the greatest the first distance, the higher the level of the visual degradation. As a consequence, the user's quality of experience is downgraded. This degradation of the visual quality of the first part has the advantage to incite the user to look toward the reference part, less degraded.

The visual degradation of the first part is advantageously obtained with any method of visual degradation known by the skilled person in the art. Such a visual degradation method downgrades the user's quality of visual experience. A visual degradation has a level parameter. According to one variant, the level parameter goes from 0.0 (no modification at all) to 1.0 (the worst quality of the first part). An example of visual degradation is color fading down: image's colors are unchanged at level 0 and are progressively darkened up to black at level 1. A complementary example of such a method is color fading up: image's colors are progressively lightened up to white. According to other variants of such a visual degradation method, image's color saturation is modified up or down. Image blurring and image noising are other examples of visual degradation method. This latter example consists in introducing a random variation in brightness and/or color information of the image. The more variation introduced, the higher the level of noising. At level 1, objects represented on the image are no longer identifiable. Image pixelating and several image compression methods are other examples of visual degradation. According to another variant the level parameter of degradation goes from 0 to 255 or from −100 to 100, for instance.

According to another embodiment, the level of degradation for a given first distance is increasing over the time. For example, the viewing session is starting without reference part because there is no highlight in the narration at this moment. A while later, a reference part is identified to incite the user to look toward it. If the user is looking elsewhere the first distance, called dist, is high. A level of degradation, called lev, is computed for this first distance dist. The first part is not degraded at all at this instant. In order to avoid a sudden leap of the visual quality of the first part, according to this embodiment, the level of visual degradation is set to a very low value, for example zero. Then, the level of visual degradation does progressively increase, for this first distance dist, up to the level lev. When the level of degradation has reached the level lev, it does no longer increase. For example, if the chosen degradation method is color fading out, the first part will become darker and darker over the time for the given first distance dist. Only the decreasing of the first distance, thanks, for instance, to a move of the user's head toward the reference part, would attenuate this effect.

FIG. 4 shows another embodiment of the present principles, wherein the first part is divided into subparts. For example, the subparts of the first part have one pixel size and are organized as a regular grid. According to another example, subparts are hexagons of different sizes. On FIG. 4, the first part (13) is divided in rectangular subparts (e.g. 40 and 41). A second distance is computed for each subpart (e.g. 42 and 43). The second distance is computed by using any method used for the computation of the first distance. On FIG. 4, the subpart (40) is further from the reference part than the subpart (41) is. The level of visual degradation is higher for the subpart (40) than for the subpart (41). On this example, the more a subpart is on the right and on the bottom of the first part (13), the higher the level of degradation. This creates a gradient of the visual quality of the first part. This embodiment, alone or combined with the progressive increasing of the visual degradation level as described upper, has the advantage of appearing like a wave that drives the user to direct his/her gaze toward the less degraded subpart of the first part and to unconsciously rotate his/her head toward the reference part.

The same distance method is advantageously used to compute the second distance of every subpart for a sake of consistency. According to a variant, a different distance computation method is used for at least two subparts. This variant however causes inconsistency in the set of distances and in the level of degradation of subparts.

FIG. 6 diagrammatically shows a first hardware embodiment of a device (60) configured for processing a first part of a video content. The device (60) comprises at least a video part selection unit (61), an image degradation unit (62) and a controller (63). Advantageously, the system is connected to a display device (64) to which the first part is transmitted. According to a particular embodiment, the device (60) is a HMD or a tablet or a smartphone. In this case, one of the controllers is the HMD's inertial sensor system. An inertial sensor system comprises, for example, three gyroscopes, one for the pitch, one for the yaw and one for the roll. According to another embodiment, the controller comprises at least one Inertial Measurement Unit (IMU). In another example, the device (60) is a set-top box or a personal computer and the controller is a joystick, a joypad, a mouse, a remote control or a keyboard. In some variants, cameras are used to locate the controller device in space. The Image Degradation unit (62) is configured to receive and transmit data representative of a part of an immersive video represented as an image or as a sequence of images via a wireless link for example. According to another example, the image degradation unit (62) is configured to receive and transmit data via a wired link, for example according to USB or HDMI standard.

FIG. 7 diagrammatically shows a second hardware embodiment of a device (70). In this example, the device (70) comprises the following elements, connected to each other by a bus (76) of addresses and data that also transports a clock signal:
- a microprocessor (71) (or CPU),
- a graphics card (72) comprising:
  - several Graphical Processor Units (or GPUs) (720),
  - a Graphical Random Access Memory (GRAM) (721),
- a non-volatile memory of ROM (Read Only Memory) type (73),
- a Random Access Memory or RAM (74),
- Controllers (63) (e.g. IMU),
- one or several I/O (Input/Output) devices (75) such as for example a tactile interface, a mouse, a webcam, etc. and
- a power source (77).

Advantageously, the device (70) is connected to one or more display devices (64) of display screen type directly to the graphics card (72) to display images calculated in the graphics card.

It is noted that the word "register" used in the description of memories (721), (73) and (74) designates in each of the memories mentioned, both a memory zone of low capacity (some binary data) as well as a memory zone of large capacity (enabling a whole program to be stored or all or part of the data representative of data calculated or to be displayed).

When switched-on, the microprocessor (71) loads and executes the instructions of the program contained in the RAM (74).

The random access memory (74) notably comprises:
- in a register (740), the operating program of the microprocessor (71) responsible for switching on the device (70),
- data (741) representative of the image(s) of the immersive video content (for example RGB data or YUV data),
- information (742) representative of the reference parts associated to the timestamps of the video content.

According to one particular embodiment, the algorithms implementing the steps of the method specific to the present disclosure and described hereafter are advantageously stored in the memory GRAM (721) of the graphics card (72) associated with the device (70) implementing these steps. When switched on and once the data (741) and the information (742) are loaded into the RAM (74), the graphic processors (720) of the graphics card (72) load these parameters into the GRAM (721) and execute the instructions of these algorithms in the form of microprograms of "shader" type using HLSL (High Level Shader Language) language or GLSL (OpenGL Shading Language) for example.

The random access memory GRAM (721) notably comprises data representative of the displayed part of the video content in a register (7210).

According to another variant, a part of the RAM (74) is assigned by the CPU (71) for storage of the algorithms. This variant however causes greater latency time in the composition of an image as the data must be transmitted from the random access memory (74) to the graphics card (72) passing by the bus (76) for which the transmission capacities are generally inferior to those available in the graphics card for transmission of data from the GPUs to the GRAM and vice-versa.

According to another variant, the power supply (77) is external to the device (70).

FIG. 5 diagrammatically shows a first embodiment of a method as implemented in a processing device such as the devices (60) or (70) according to a non-restrictive advantageous embodiment.

The method takes two data in entry: a first part (13), representative of a part of an immersive video content and a reference part (20) of the same immersive video content. First part and reference part are associated with the description of their position and shape within the frame of reference of the immersive video content.

A first step (51) consists in determining a first distance between the first part and the reference part. According to an advantageous variant, this first distance is a scalar value normalized between 0.0 and 1.0. According to another variant, the first distance is measured in pixels or is an angular distance measured in degrees or in radians. The result of the step (51) is used by a second step (52). At step (52), a level of visual degradation is computed according to the provided first distance: the greater the first distance, the higher the level of visual degradation. According to this level, the image of the first part is visually degraded. Step (52) is using any of the visual quality degradation method described upper. A degraded version (53) of the first part's image is produced at this step.

FIG. 8 diagrammatically shows a second embodiment of a method as implemented in a processing device such as the device (60) or (70), according to a non-restrictive advantageous embodiment.

During an initialisation step (80), the different parameters of the processing device (60) or (70) are updated. In particular, the parameters specific to the controllers are initialised in any way. For example, if the device (60) or (70) is a HMD, a very first set of three angles is determined by comparing the position of the device with a world reference direction in a world fixed frame of reference. This frame of reference does, for instance, use horizontal and vertical axis with an azimuth toward North for example or toward an associated camera. No reference part is initially identified. In other words, there is no reference part to incite the user to look toward at the very starting of the application.

An immersive video content is associated with a projection mapping mode, for example, cylindrical (as illustrated on FIG. 1), cubic or spherical. This projection mapping mode defines a content reference direction in its own frame of reference. According to a variant, a correspondence is established between this content reference direction and the world reference direction chosen during the initialisation step (80).

During step (81) a first part of the video content is selected according to the controllers' parameters. The first time this step is executed, the default values of these parameters are used. The controllers' parameters are used at this step to determine the position of the first part in the immersive video content's frame. In an embodiment in which the display is an inherent element of the device (60) or (70), such as HMD, according to this position on the first hand and the characteristics (for example shape and field of view) of the display screens on the other, the first part of the immersive video content is "cut out" and selected. According to a variant, this step is executed when an event (82) is detected by at least one of the controllers. For example, if the user is using a joystick to browse the immersive video content, the step (81) is executed when the user is operating his/her joystick. According to another variant, if the device (60) or (70) is a HMD, the step (81) is executed when a change of the HMD position is detected by its inertial measurement unit for example. According to another variant, the step (81)

is executed more often, for example for each frame of the immersive video content. An execution of the step (81) automatically causes the execution of the next step (83).

During step (83), both steps of the method shown on FIG. 5 are executed. A first distance between the first part and a reference part is determined and the quality of the first part is degraded. The level of degradation is computed at this step (83) according to a first distance: the greater the first distance, the higher the level of visual degradation. If there is no reference part, the first distance is set to zero. As a consequence, the image is not degraded at all. Otherwise, the first distance between the part to be displayed and the reference part is computed. According to a particular example, this first distance is the shortest Euclidian distance, in the immersive video content's frame of reference, between a centre, for example the centroid, of the first part and the centre, for another example the centre of gravity, of the reference part. According to another embodiment, this first distance is the shortest distance between any point of the first part and any point of the reference part. Once the first distance is computed, a level of degradation is chosen following the principle: the greater the first distance, the higher the level of degradation. This choice depends on the means selected for visually degrading the image. According to one variant, the colour of the first part is fading down. According to another variant, some noise is introduced in the part to be displayed as illustrated on FIGS. 3A and 3B. At step (83) the displayed part is visually degraded using the selected degradation means.

At any time, the reference part may change (84). Such a change is, for example, obtained within the content data stream. According to a second example, this information is obtained from a remote server. According to a third example, the reference part is defined by a region of interest detection algorithm. In this example, the corresponding information is obtained thanks to the analysis of the immersive video content's sequence of images by such an algorithm. The program for the execution of such a region of interest detection algorithm is advantageously stored in a register of the GRAM (621) of a device (70) or, according to a variant, is loaded in a register of the RAM (64). When a change of the reference part is detected, the step (83) is executed.

According to another embodiment, the level of degradation for a given first distance is increasing over the time. For example, the viewing session is starting without reference part because there is no highlight in the narration at this moment. A while later, a reference part is identified to incite the user to look toward it. If the user is looking elsewhere the first distance, called dist, is high. A level of degradation, called lev, is computed for this distance dist. The first part is not degraded at all at this instant. In order to avoid a sudden leap of the visual quality of the first part, according to this embodiment, the level of visual degradation is set to a very low value, for example zero. Then, the level of visual degradation does progressively increase, for this first distance dist, up to the level lev. When the level of degradation has reached the level lev, it does no longer increase. For example, if the chosen degradation method is pixelating, the first part will become more and more pixelated over the time for the given first distance dist. For the example wherein the device (60) or (70) is a HMD, only a move of the user's head (that is a controller event (63)) toward the reference part would attenuate this effect by triggering the step (81) and, as a consequence, the step (83).

According to another embodiment, at step (83), the first part is divided into subparts. According to a variant, the subparts have one pixel size and are organized as a regular grid. According to another variant, subparts are squares of different sizes, the set of squares covering the entire area of the immersive video content. A second distance is computed for each subpart at this step (83). The second distance is determined by using one of the distances described for the first distance. According to one variant, the same distance is used to compute the second distance of every subpart for a sake of consistency. This variant of step (83) is implemented alone or in combination with the variant wherein the visual degradation level is progressively increasing.

Naturally, the present disclosure is not limited to the embodiments previously described.

In particular, the present disclosure is not limited to a method of processing an immersive video content but also extends to any method of displaying the processed first part and to any device implementing this displaying method. The implementation of calculations necessary to generate the first part and subparts is not limited either to an implementation in shader type microprograms but also extends to an implementation in any program type, for example programs that can be executed by a CPU type microprocessor. The use of the methods of the present disclosure is not limited to a live utilisation but also extends to any other utilisation, for example for processing known as postproduction processing in a recording studio.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of rendering a first part of an immersive video content having a field of view wider than a field of view of a user, the method comprising:
   obtaining parameters from at least one controller, said parameters being representative of a first part to render, said first part being a part of the immersive content corresponding to the field of view of the user;
   determining a first distance between said first part and at least one reference part of the immersive video content;
   processing a version of said first part, called degraded version, by degrading a visual quality of said first part according to said first distance, the greater the first distance, the higher the level of the visual degradation; and
   rendering said degraded version of the first part; wherein said first distance is:
      an Euclidian distance between a center of said first part and a center of said at least a reference part, or
      the shortest Euclidian distance among a set of distances between any point of said at least a reference part and any point of said first part, or
      an average Euclidian distance of distances between any point of said at least a reference part and any point from said first part.

2. The method according to claim 1, wherein said first part is divided in subparts, a second distance between each said subpart and said at least one reference part being determined, the greater the second distance, the higher the level of degradation for each said subpart.

3. The method according to claim 1, wherein said level of degradation increases over time.

4. The method according to claim 1, wherein the visual degradation of said first part belongs to a group of visual degradations comprising:
   blurring,
   fading down or up colors,
   saturating down or up colors,
   noising,
   pixelating.

5. The method according to claim 1, wherein said first distance is determined according to several reference parts.

6. The method according to claim 1, further comprising transmitting said degraded version to a display device.

7. The method according to claim 1, wherein position of said first part is controlled by the user through controller devices.

8. A device configured for rendering a first part of an immersive video content having a field of view wider than a field of view of a user, the device comprising a memory associated with a processor configured to:
   obtain parameters from at least one controller, said parameters being representative of a first part to render, said first part being a part of the immersive content currently rendered and corresponding to the field of view of the user;
   determine a first distance between said first part and at least a reference part,
   process a version of said first part, called degraded version, by degrading a visual quality of said first part according to said first distance, the greater said first distance, the higher the level of degradation;
   render said degraded version of the first part; wherein said first distance is:
      an Euclidian distance between a center of said first part and a center of said at least a reference part, or
      the shortest or an average Euclidian distance between any point of said at least a reference part and any point of said first part.

9. The device according to claim 8, wherein said first part is divided in subparts, a second distance between each said subpart and said at least a reference part being determined, the greater the second distance, the higher the level of degradation for said each subpart.

10. The device according to claim 8, wherein said level of degradation increases over time.

11. The device according to claim 8, wherein the visual degradation of said first part belongs to a group of visual degradations comprising:
    blurring,
    color fading down or up,
    color saturating down or up,
    noising,
    pixelating.

12. The device according to claim 8, wherein said first distance is determined according to several reference parts.

13. The device according to claim 8, further comprising transmitting said degraded version to a display device.

14. The device according to claim 8, wherein position of said first part is controlled by the user through controller devices.

15. A non-transitory computer-readable medium comprising a computer program product recorded thereon and capable of being run by a processor, including program code instructions for implementing the steps of the method of rendering a first part of an immersive video content according to claim 1 when it is executed by a processor.

16. A method comprising:
- determining a first distance between a first part of an immersive video content and at least one reference part of the immersive video content, wherein the immersive video content has a field of view wider than a field of view of a user and the first part corresponds to the field of view of the user;
- degrading a visual quality of the first part according to the first distance to produce a degraded version of the first part, wherein a level of degradation of the visual quality of the degraded version of the first part increases as the first distance increases;
- rendering said degraded version of the first part; wherein said first distance is:
  - an Euclidian distance between a center of said first part and a center of said at least a reference part, or
  - the shortest Euclidian distance among a set of distances between any point of said at least a reference part and any point of said first part, or
  - an average Euclidian distance of distances between any point of said at least a reference part and any point from said first part.

17. The method according to claim 16, wherein the first part is divided in subparts, a second distance between each of the subparts and the at least one reference part being determined, the greater the second distance, the higher the level of degradation for each of the subparts.

18. The method according to claim 16, wherein the level of degradation increases over time.

* * * * *